United States Patent
Alfke

[19]

[11] Patent Number: 5,898,893
[45] Date of Patent: Apr. 27, 1999

[54] FIFO MEMORY SYSTEM AND METHOD FOR CONTROLLING

[75] Inventor: Peter H. Alfke, Los Altos Hills, Calif.

[73] Assignee: Xilinx, Inc., San Jose, Calif.

[21] Appl. No.: 08/899,362

[22] Filed: Jul. 23, 1997

Related U.S. Application Data

[63] Continuation-in-part of application No. 08/541,860, Oct. 10, 1995, Pat. No. 5,758,192.

[51] Int. Cl.$^6$ ..................................................... G06F 12/00
[52] U.S. Cl. ............................................................. 395/877
[58] Field of Search ....................... 395/877; 365/189.01, 365/221, 78; 711/219, 100

[56] References Cited

U.S. PATENT DOCUMENTS

| | | | |
|---|---|---|---|
| 4,873,667 | 10/1989 | Geadah et al. | 365/189.07 |
| 4,891,788 | 1/1990 | Kreifels et al. | 365/49 |
| 5,084,841 | 1/1992 | Williams et al. | 365/189.07 |
| 5,088,061 | 2/1992 | Golnabi et al. | 365/189 |
| 5,220,586 | 6/1993 | Tai | 365/189 |
| 5,262,996 | 11/1993 | Shiue | 365/221 |
| 5,311,475 | 5/1994 | Huang | 365/221 |
| 5,381,126 | 1/1995 | McClure et al. | 365/189 |
| 5,426,756 | 6/1995 | Shyl et al. | 395/425 |
| 5,555,524 | 9/1996 | Castellano | 365/221 |

OTHER PUBLICATIONS

Xilinx Data Book entitled "Field Programmable Gate Array Family Data Book", XC4000E Series, Preliminary Product Specifications, available from Xilinx, Inc., 2100 Logic Drive, San Jose, California 95124, published Sep. 7, 1995 (Version 1.04).

*Primary Examiner*—David Y. Eng
*Attorney, Agent, or Firm*—Edel M. Young

[57] ABSTRACT

A structure and method for determining whether a first in, first out (FIFO) memory is empty or full when the read address of the memory equals the write address of the memory. The read and write addresses are individually incremented, using a Grey code to avoid decoding glitches. The address space is circular and is divided at least three segments. Portions of the read and write addresses are encoded to indicate the segments in which the read and write addresses are located. These encoded address portions are decoded to determine the relative segment positions of the read and write addresses. If the read address is in the segment prior to the write address, a DIRECTION signal is set to a first state. If the write address is in the segment prior to the read address, the DIRECTION signal is set to a second state. When the read address equals the write address, the state of the DIRECTION signal is used to determine whether the memory is empty or full. If the DIRECTION signal is in the first state, the memory is empty. If the DIRECTION signal is in the second state, the memory is full.

15 Claims, 8 Drawing Sheets

FIFO MEMORY SYSTEM AND METHOD FOR CONTROLLING

This application is a continuatuion-in-part of Ser. No. 08/541,860, filed Oct. 10, 1995 now U.S. Pat. No. 5,758,192.

FIELD OF THE INVENTION

This invention relates to a first in, first out (FIFO) memory. More particularly, this invention relates to a method and structure for determining whether a FIFO memory is empty or full, thereby facilitating control of the FIFO memory.

DESCRIPTION OF THE PRIOR ART

Data values sequentially written to a FIFO memory are sequentially read from the FIFO memory in a first in, first out manner. Most FIFO memories are implemented as random access memories having two separate address counters. One address counter is used to maintain a current read address and the other counter is used to maintain a current write address. Both the read and write address counters are circular counters which wrap around to an initial address after a last address is accessed. The read and write address counter outputs are either multiplexed to address a single-port RAM, or they are separately provided to address different inputs of a multi-port RAM (e.g., a dual-port RAM).

In either scheme, two extreme conditions, namely FIFO EMPTY and FIFO FULL, must be detected to ensure proper operation of the FIFO. The FIFO EMPTY condition must be detected so that read operations from the FIFO can be prevented during the time that the FIFO is empty (since there are no valid data values present in the FIFO to read). The FIFO FULL condition must be detected so that write operations to the FIFO can be prevented during the time that the FIFO is full (since there is no memory space present in the FIFO to store any additional data values).

The contents of the read and write address counters are typically used to determine whether the FIFO is empty or full. To do this, the contents of the read and write address counters are compared. If the contents of the read address counter are identical to the contents of the write address counter, the FIFO is either empty or full. However, identity of the contents of the read address counter and the write address counter, by itself, does not distinguish whether the FIFO is empty or full. That is, the contents of the read address counter are identical to the contents of the write address counter when the FIFO is empty, and also when the FIFO is full.

One conventional method used to determine whether the FIFO is empty or full is to detect what type of operation caused the contents of the read and write address counters to match. If a read operation was performed (i.e., the read address counter was incremented), the resulting equality of the read and write address counters indicates a FIFO EMPTY condition. Conversely, if a write operation was performed (i.e., the write address counter was incremented), the resulting equality of the read and write address counters indicates a FIFO FULL condition. However, determining the type of operation which caused the contents of the read and write address counters to match can become complicated, particularly when the read and write address counters are clocked asynchronously.

Another prior art system subtracts the contents of the read and write address counters to determine when the read address is within one address of catching up to the write address and when the write address is within one address of catching up to the read address. Again, the subtraction circuitry for such a system can become complicated and even unreliable, particularly when the read and write address counters are clocked asynchronously.

It would therefore be desirable to have an uncomplicated method and structure for detecting the FULL and EMPTY conditions of asynchronous and synchronous FIFO memories.

SUMMARY

Accordingly, the present invention provides an uncomplicated and robust structure and method for determining whether a FIFO memory is empty or full. In one embodiment, a FIFO memory system includes a FIFO memory, a write address counter, a read address counter, and a direction circuit. The write address counter is configured to increment the write address in a predetermined circular sequence which is divided into three or more segments. A portion of the write address is encoded to indicate the segment in which the current write address is located within the circular sequence.

Similarly, the read address counter is configured to increment the read address in the same circular sequence as the write address. The circular sequence of the read address is divided into the same segments as the circular sequence of the write address. In a particular embodiment, four segments are used. A portion of the read address is encoded to indicate the segment in which the current read address is located within the circular sequence.

The direction circuit is connected to receive the encoded portions of the read and write addresses. In response, the direction circuit generates a DIRECTION signal which is set to a first state when the read address is in the segment prior to the segment of the write address, and is set to a second state when the write address is in the segment prior to the segment of the read address. The DIRECTION signal is used to determine whether the FIFO memory is empty or full when the read address equals the write address.

In a particular embodiment, the FIFO memory system includes a control circuit coupled to receive the read address, the write address and the DIRECTION signal. The control circuit asserts a FULL signal when the read address equals the write address and the DIRECTION signal is in its first state. The control circuit asserts an EMPTY signal when the read address equals the write address and the DIRECTION signal is in its second state. The asserted FULL signal, which indicates the FIFO memory is full, is used to prevent subsequent write operations to the FIFO memory. The asserted EMPTY signal, which indicates the FIFO memory is empty, is used to prevent subsequent read operations from the FIFO memory.

The control circuit can also include a first stretching circuit which prevents the FULL signal from being de-asserted for a first time period before a write operation is performed, thereby allowing adequate set up time for a subsequent write operation. The control circuit can also include a second stretching circuit which prevents the EMPTY signal from being de-asserted for a second time period before a read operation is performed, thereby allowing adequate set up time for a subsequent read operation.

The read and write addresses in one embodiment are implementing using a Grey code so that no more than one address bit changes at one time, and decode glitches are thus avoided.

The present FIFO memory system can be implemented, e.g., by a field programmable gate array or any other type of integrated circuit chip. Furthermore, the write address counter and the read address counter can be operated synchronously or asynchronously.

The invention also includes a method of operating a FIFO memory system which includes the steps of:

(1) incrementing the write address of a FIFO memory in a predetermined circular sequence, wherein the circular sequence is divided into three or more segments, (2) encoding a portion of the write address to indicate the segment in which the write address exists within the circular sequence, (3) incrementing the read address of the FIFO memory in the same predetermined circular sequence as the write address, (4) encoding a portion of the read address to indicate the segment in which the read address exists within the circular sequence, (5) comparing the segment in which the write address exists to the segment in which the read address exists, (6) driving a DIRECTION signal to a first state (near empty) when the read address exists in the segment prior to the segment in which the write address exists, (7) driving a DIRECTION signal to a second state (near full) when the write address exists in the segment prior to the segment in which the read address exists, and (8) using the DIRECTION signal to determine whether the FIFO memory is empty or full.

The present invention will be more fully understood in light of the following detailed description taken together with the drawings.

BRIEF DESCRIPTION OF THE DRAWINGS

FIG. 3b is a truth table which illustrates the successive states of the address counter of FIG. 3a;

DETAILED DESCRIPTION

Figure 1:
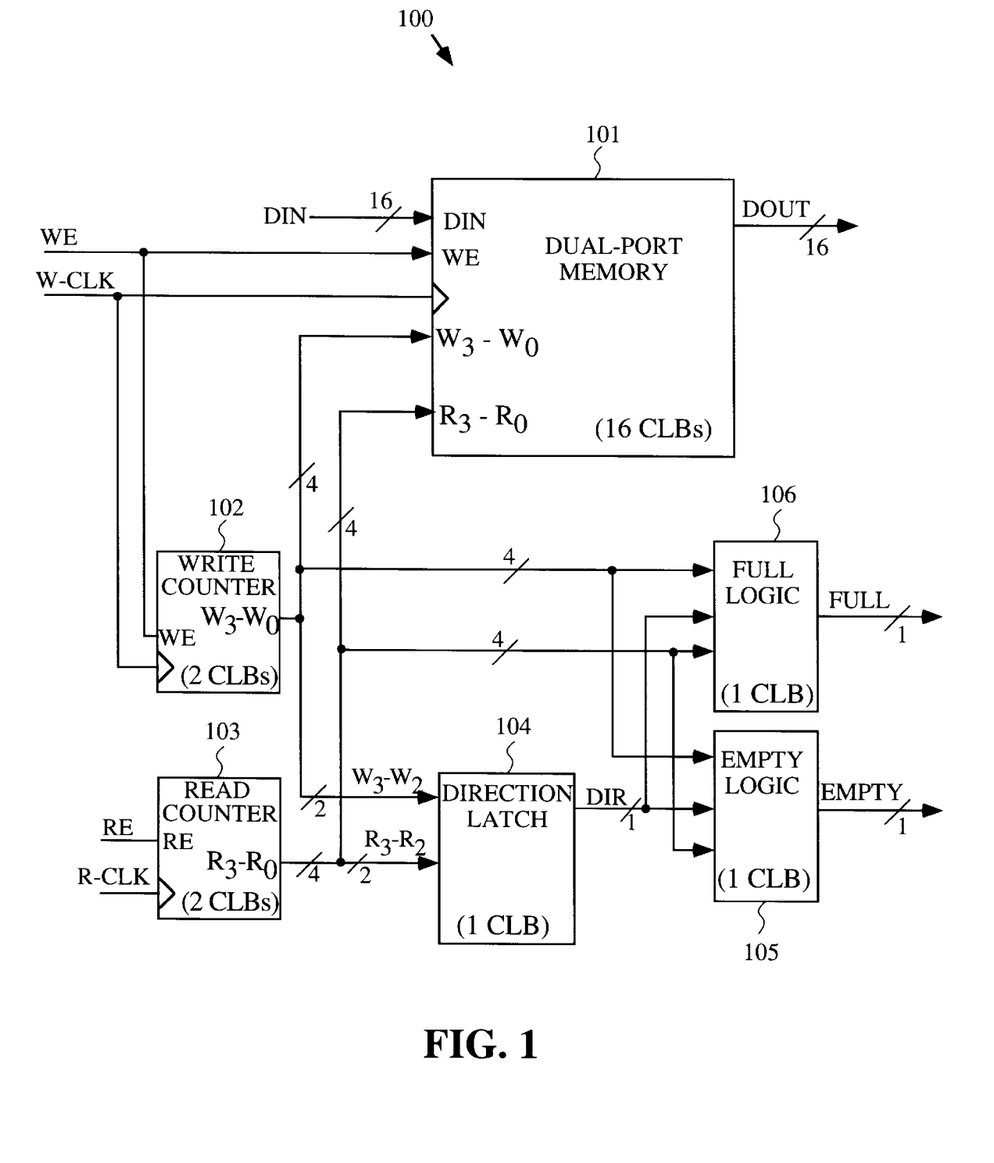
FIG. 1 is a block diagram of a FIFO memory system in accordance with one embodiment of the invention.

FIG. 1 is a block diagram of a FIFO memory system 100 in accordance with one embodiment of the invention. Memory system 100 includes 16×16 bit dual-port FIFO RAM 101, 4-bit write address counter 102, 4-bit read address counter 103, clocked direction circuit 104, EMPTY logic circuit 105 and FULL logic circuit 106.

In general, direction circuit 104 (a latch or flip flop) stores a 1-bit value which indicates whether the address in read address counter 103 (i.e., the read address) is about to catch up to the address in write address counter 102 (i.e., the write address), or whether the write address is about to catch up with the read address. If the bit value in direction circuit 104 indicates that the read address is about to catch up to the write address, and the read address becomes identical to the write address, EMPTY logic circuit 105 generates a signal to indicate that FIFO 101 is empty. If the bit value in direction circuit 104 indicates that the write address is about to catch up to the read address, and the read address becomes identical to the write address, FULL logic circuit 106 generates a signal to indicate that FIFO 101 is full. The operation of memory system 100 is described in more detail below.

Dual-port FIFO memory 101 is a conventional circuit which is controlled by a write enable signal WE, a write clock signal WCLK, a 4-bit read address R3-R0 and a 4-bit write address W3-W0. When the write enable signal WE is asserted, the rising edge of the write clock signal WCLK causes a data input signal DIN to be written to the current write address W3-W0 of FIFO memory 101 through the first port of memory 101.

The second port of FIFO 101 presents a data value DOUT from the current read address R3-R0 of FIFO 101. When the read enable signal RE is asserted, the rising edge of the read clock signal RCLK increments read address counter 103 to the next read address. The second port then presents a data value DOUT from this next read address.

In one embodiment, dual-port FIFO memory 101 is implemented by a field programmable gate array (FPGA). Such an embodiment is illustrated by FIG. 1. For example, FIFO memory 101 can be implemented using Xilinx's XC4000E FPGA, as described in Xilinx's XC4000E Field Programmable Gate Array Family Preliminary Product Specifications, dated Sep. 7, 1995 (Version 1.04), hereby incorporated by reference.

Figure 2:
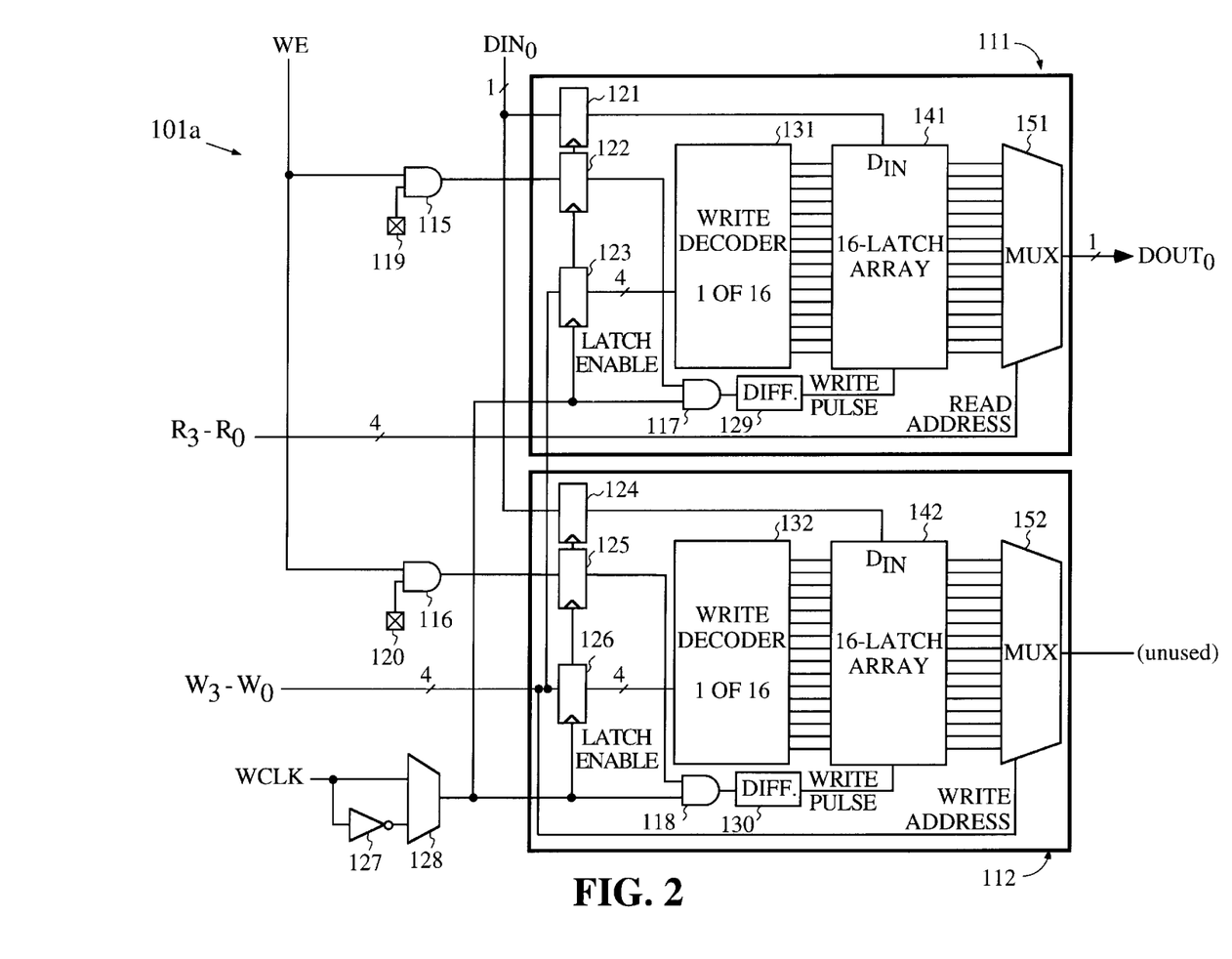
FIG. 2 is a schematic diagram illustrating circuitry used for one column of a FIFO memory in an FPGA.

FIG. 2 is a schematic diagram illustrating circuitry used to create one column 101a (16 bits deep×1 bit wide) of FIFO memory 101, as implemented in the XC4000E FPGA. Column circuit 101a stores the least significant bits $DIN_0$ and $DOUT_0$ of the DIN and DOUT signals. Column circuit 101a is repeated 16 times to create 16×16 FIFO memory 101. The XC4000E FPGA uses configurable logic blocks (CLBs) to implement desired memory and logic functions. One CLB is required to form column circuit 101a and sixteen CLBs are required to form FIFO memory 101. The number of CLBs required to form each of circuits 101–106 using the XC4000E FPGA is shown in FIG. 1.

Column circuit 101a includes AND gates 115–116, configurable bit latches 119–120, inverter 127, multiplexer 128 and function generators 111 and 112. Function generators 111 and 112 include AND gates 117–118, latches 121–126, differentiator circuits 129–130, 1-of-16 write decoders 131–132, 16-latch arrays 141–142 and 16-to-1 multiplexers 151–152. Function generators 111 and 112 are operated as RAM.

The data input signal $DIN_0$ is provided to latches 121 and 124. Configurable bit latches 119 and 120 are programmed to provide logic "1" values to respective AND gates 115 and 116. The other input terminals of AND gates 115 and 116 receive the write enable signal WE. As a result, the write enable signal WE is provided to latches 122 and 125. The write address signals W3–W0 are provided to latches 123 and 126. The write clock signal WCLK (or its inverse) is routed through multiplexer 128 to the clock input terminals of latches 121–126 and to input terminals of AND gates 117 and 118.

Latches 121 and 124 provide the data input signal DIN0 to the respective input terminals of 16-latch arrays 141 and 142. The write enable signal WE is routed from latches 122 and 125 to AND gates 117 and 118, respectively, thereby creating a pair of write signals which are provided to differentiator circuits 129 and 130 when the write clock signal WCLK has a logic "1" value. In response, differentiator circuits 129 and 130 generate write pulses which have a duration less than the time the write clock signal WCLK has a logic "1" value (i.e., a half cycle of the WCLK signal). These write pulses are provided to 16-latch arrays 141 and 142. Latches 123 and 126 provide the write address signals W3–W0 to 1-of-16 write decoders 131 and 132, respectively. In response, write decoders 131 and 132 transmit signals to enable the addressed rows in respective 16-latch arrays 141 and 142. As a result, the data signal $DIN_0$ is written to the addressed row in both of 16-latch arrays 141 and 142.

Read address signals R3–R0 are provided to multiplexer 151. Multiplexer 151 receives the data values stored in each of the 16 addresses in 16-latch array 141, and passes the data value from the address which corresponds to read address signals R3–R0. This data value is provided as data signal $DOUT_0$. As a result, column 101a can be accessed in a dual-port manner using separate read and write addresses. Two function generators 111 and 112 are required to obtain this dual-port capability in the XC4000E FPGA because each function generator has only one set of address input lines.

In another embodiment, memory system 100 is fabricated on an integrated circuit chip other than a Xilinx FPGA. In such an embodiment, dual-port FIFO 101 can be implemented as a standard dual-port memory.

Figure 3A:
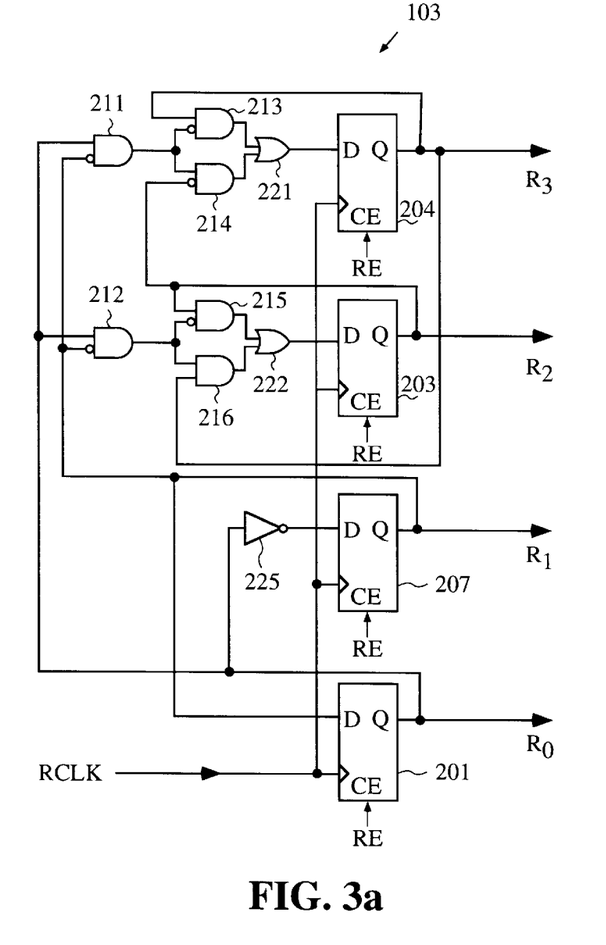
FIG. 3a is a schematic diagram of an address counter in accordance with one embodiment of the invention.

The generation of the read and write address signals will now be described. FIG. 3a is a schematic diagram of a read address counter 103a for implementing read address counter 103 of FIG. 1 in accordance with one embodiment of the invention. In this embodiment, read address counter 103a includes D-Q flip flops 201–204, AND gates 211–216, OR gates 221, 222 and inverter 225. Read address counter 103a is a 4-bit circular counter which advances to the next address in response to a read enable signal RE and a read clock signal RCLK. The read clock signal RCLK is coupled to the clock input terminal of each of flip flops 201–204. The read enable signal RE, which is coupled to the clock enable (CE) input terminal of each of flip flops 201–204, is asserted each time a new read address is to be generated. The timing of the read enable signal RE and the read clock signal RCLK is known by those skilled in the art.

The address signals R3–R0 provided by read address counter 103a are encoded. The two least significant bits R1–R0 are encoded using a standard Grey code and the two most significant bits R3–R2 are also encoded using a standard Grey code. This Grey coding ensures that each time read address counter 103 changes state, only one of the two most significant address bits R3–R2 changes state.

Figure 3B:
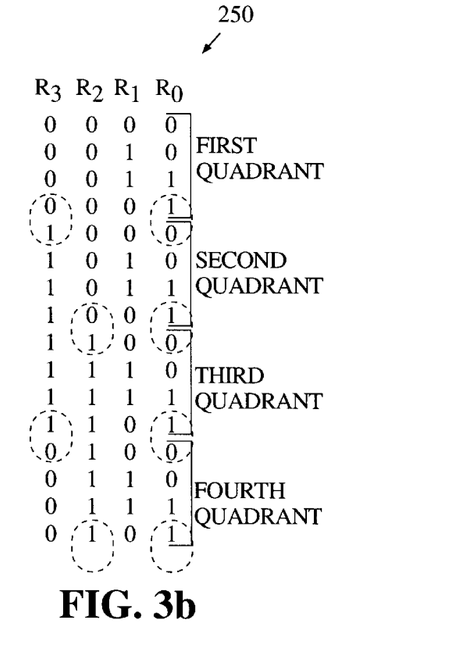

FIG. 3b is a truth table 250 which illustrates the successive states (from top to bottom) of read address counter 103a. Read address counter 103a divides the circular address range into four quadrants which are identified by the two most significant bits R3–R2 of the read address. Thus, as the read address progresses through the first, second, third and fourth quadrants, the two most significant address bits R3–R2 have values of 00, 10, 11 and 01, respectively. As described in more detail below, the quadrant of the read address and the quadrant of the write address are compared in direction latch 104, and the results are stored to determine whether FIFO memory 101 is empty or full when the read address becomes equal to the write address. Although the present embodiment is described in accordance with four quadrants, divisions involving other numbers of segments can be used. However, at least three segments must be used.

Referring to FIG. 1, the two most significant bits W3–W2 of the write address and the two most significant bits R3–R2 of the read address are provided to direction circuit 104. As previously described, these most significant bits indicate the quadrants of the read and write address as defined in connection with FIG. 3b. Direction circuit 104 uses this quadrant information to generate a DIRECTION signal which is used to indicate whether an equality between the read address R3-R0 and the write address W3-W0 indicates a FIFO EMPTY condition or a FIFO FULL condition.

To determine whether FIFO memory 101 is empty or full when the read address becomes equal to the write address, the quadrant of the read address and the quadrant of the write address are compared, and the results are stored. Although the present embodiment is described in accordance with four segments (quadrants), divisions involving other numbers of segments can be used. However, at least three segments must be used.

Write address counter 102 (FIG. 1) includes circuitry which is identical to the circuitry in read address counter 103. However, write address counter 102 operates in response to the write enable signal WE and the write clock signal WCLK to provide a 4-bit write address W3-W0. The write addresses W3–W0 are encoded in the same manner as read addresses R3–R0. Thus, the two most significant bits W3–W2 of the write address identify a quarter of the write address.

The write clock signal WCLK and the read clock signal RCLK can be a common system clock signal (synchronous operation). Alternatively, these clock signals can be separate clock signals having different frequencies (asynchronous operation). In both synchronous and asynchronous systems, the read enable signal RE and write enable signal WE must honor set-up time requirements specific to the corresponding read clock signal and write clock signal to allow for proper operation of read address counter 103 and write address counter 102. The two most significant bits W3–W2 of the write address and the two most significant bits R3–R2 of the read address are provided to direction circuit 104. As previously described, these most significant bits indicate the quadrants of the read and write address as defined in connection with FIG. 3b. Direction circuit 104 uses this quadrant information to generate a DIRECTION signal which is used to indicate whether an equality between the read address R3-R0 and the write address W3-W0 indicates a FIFO EMPTY condition or a FIFO FULL condition.

Figure 4A:
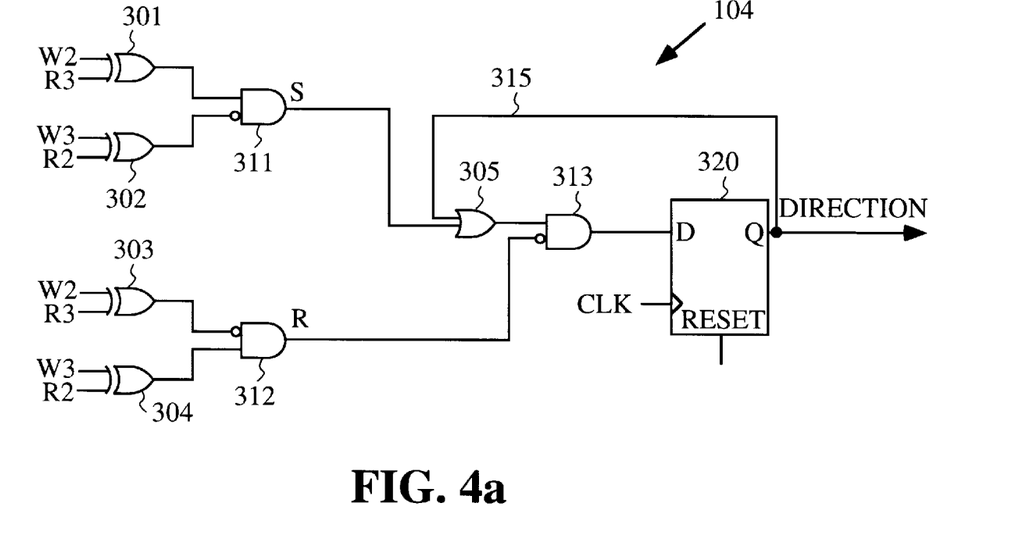
FIG. 4a is a schematic diagram of a direction circuit in accordance with one embodiment of the invention.

FIG. 4a is a schematic diagram of one embodiment of direction circuit 104 useful with synchronous logic using the same clock signal for both READ and WRITE, which includes exclusive OR gates 301–304, OR gate 305, AND gates 311–313, direction feedback line 315 and D-Q flip flop 320. Address signals W2 and R3 are provided to exclusive OR gates 301 and 303, and address signals W3 and R2 are provided to exclusive OR gates 302 and 304. AND gate 311 is coupled to receive the output signal of exclusive OR gate 301 and the inverse of the output signal of exclusive OR gate 302. AND gate 312 is coupled to receive the inverse of the output signal of exclusive OR gate 303 and the output signal of exclusive OR gate 304. The output terminal of AND gate 311 is connected to one input terminal of OR gate 305, and the DIRECTION signal feedback line 315 is connected to the other input terminal of OR gate 305. The output terminal of OR gate 305 is connected to one input terminal of AND gate 313. The output terminal of AND gate 312 is coupled to the other input terminal of AND gate 313 through an inverter. The output terminal of AND gate 313 is connected to the D input terminal of flip flop 320. Other inputs to flip flop 320 include a direction clock signal and a reset signal. The Q output terminal of flip flop 320 provides the DIRECTION signal.

Direction circuit 104 decodes the relative quadrant positions for the current read and write addresses. If both the read and write addresses are in the same quadrant (i.e., W3 W2 R3 R2=0000, 1010, 1111 or 0101) or separated by two quadrants (i.e., W3 W2 R3 R2=0011, 1001, 1100 or 0110) the state of the DIRECTION signal remains unchanged. If the write address is one quadrant behind the read address (i.e., W3 W2 R3 R2=0010, 1011, 1101 or 0100), the DIRECTION signal is set to a logic "1" value. If the read address is one quadrant behind the write address (i.e., W3 W2 R3 R2=0001, 1000, 1110 or 0111), the DIRECTION signal is reset to a logic "0" value.

When system 100 is initialized, both the read address R3-R0 and the write address W3-W0 are set to the same predetermined initial address (e.g., 0000) and the DIRECTION signal is reset to a logic "0" value. Because the read and write addresses are in the same quadrant, the DIRECTION signal initially remains at a logic "0" value. As described in more detail below, if the DIRECTION signal has a logic "0" value when the read address is equal to the write address, a FIFO EMPTY condition is indicated.

After direction circuit 104 is initialized, read and write operations are performed in various orders within memory system 100 in response to the received signals (i.e., write enable signal WE, write clock signal WCLK, read enable RE, read clock signal RCLK and data input signal DIN). As the read and write addresses enter different quadrants, the DIRECTION signal changes states as previously described. Because only one of the applied address bits R3, R2, W3, W2 changes state on any transition (because of the Grey coding), decoding glitches within direction circuit 104 are avoided.

In the embodiment of FIGS. 3a and 3b, the illustrated Grey code sequence prevents most but not all glitches. The glitch problem occurs not in the DIRECTION circuit but in the FULL and EMPTY circuits, which use all bits of the address. A glitch (transient incorrect state of an output signal causing a downstream erroneous result) can occur when two bits are to switch simultaneously, but in fact do not switch quite simultaneously and thus produce an intermediate result which is incorrect. This incorrect intermediate result might be detected by the FULL or EMPTY circuit, and thus should be avoided. Dashed lines indicate bits that switch in combination and can thus cause glitches. Therefore, it is preferred that the full address, as well as the portion used to control the direction circuit follow a Grey code.

Figure 3C:
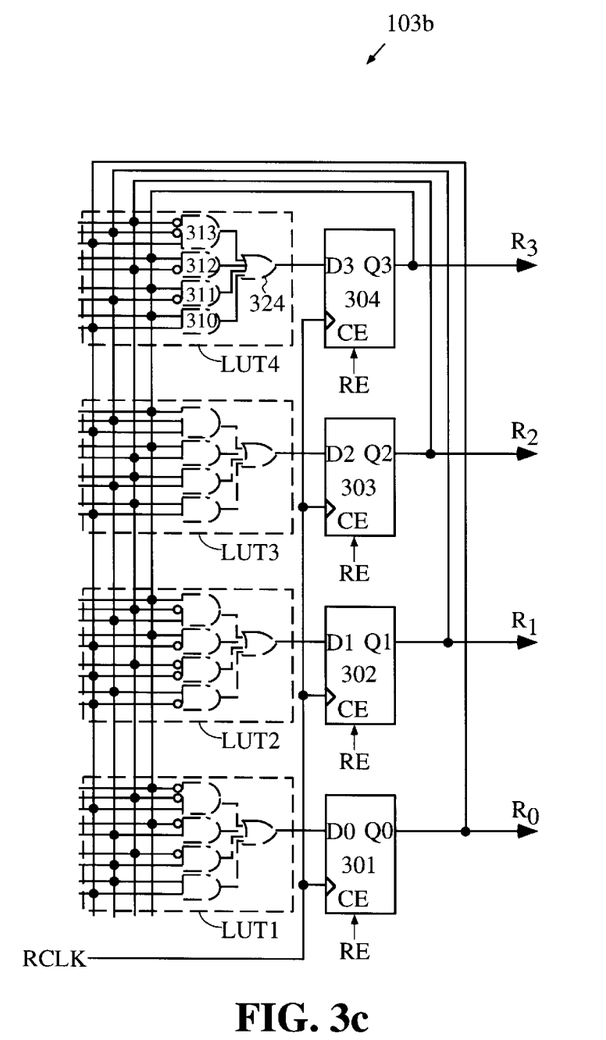
FIG. 3c is a schematic diagram of an address counter in accordance with a Grey code embodiment of the invention.
Figure 3D:
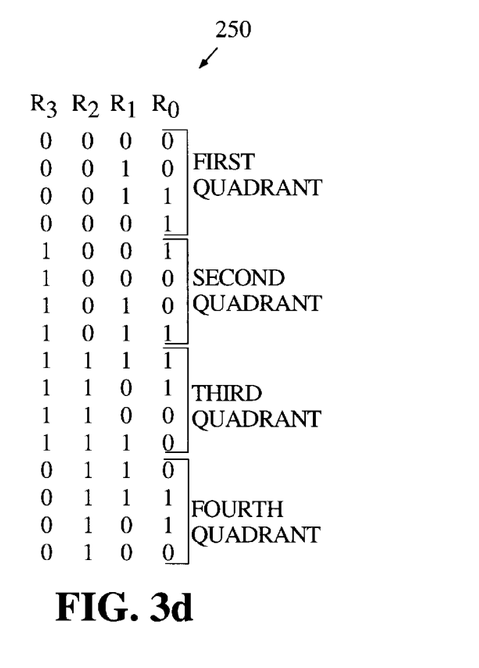
FIG. 3d is a truth table which illustrates the successive states of the address counter of FIG. 3c.

FIG. 3c implements such a circuit and generates the progression shown in FIG. 3d. The circuit of FIG. 3c is implemented in four registers 301–304 and four associated lookup tables LUT1 through LUT4 each receiving four input signals R0 through R3. A four-input lookup table can implement any function of four inputs. The particular function for generating the progression in FIG. 3d is represented in FIG. 3c by sum-of-products gates in the four lookup tables LUT1 through LUT4. For example, in LUT4, AND gates 310–313 and OR gate 324 are illustrated with connections and inverters (bubbles) to represent the equation $$D3=R0 \cdot R1 \cdot R2+R2 \cdot R3+R1 \cdot R3+R0 \cdot R3.$$

The progression shown in FIG. 3d can be seen to be a Grey code, both as to the two most significant bits R3–R2 which change every quadrant, and as to the entire address R3-R0, which changes every clock cycle. Since the entire address follows a Grey code progression, glitches are avoided. The Grey coding ensures that each time read address counter 103 changes state, only one bit of the address changes state. This prevents decoding glitches within direction circuit 104 and also within FULL and EMPTY logic circuits 105 and 106. Many other circuits can also be used to generate sequences which follow a Grey code.

Figure 3E:
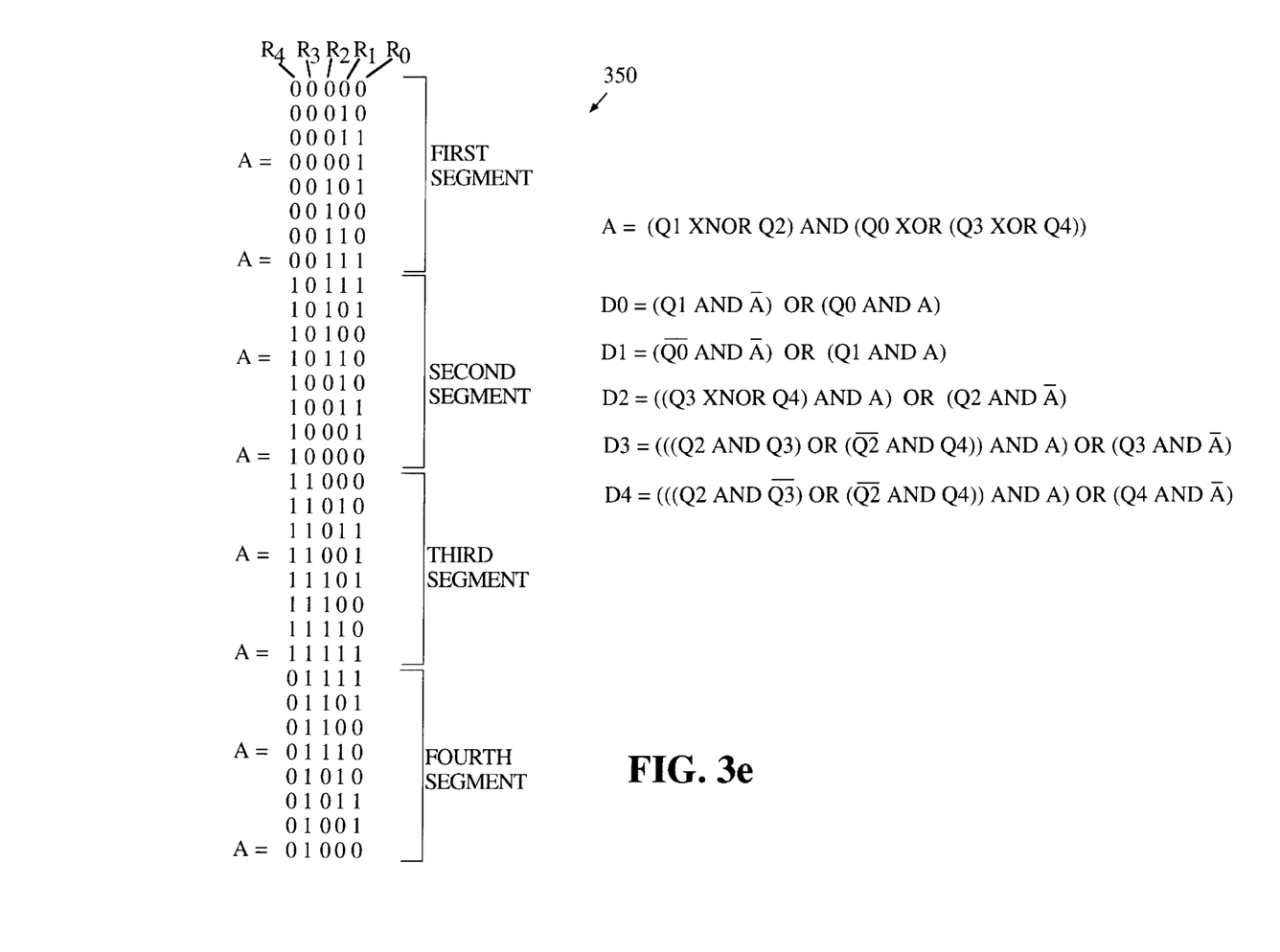
FIG. 3e illustrates successive states of a 32-bit address counter and related equations.
Figure 3F:
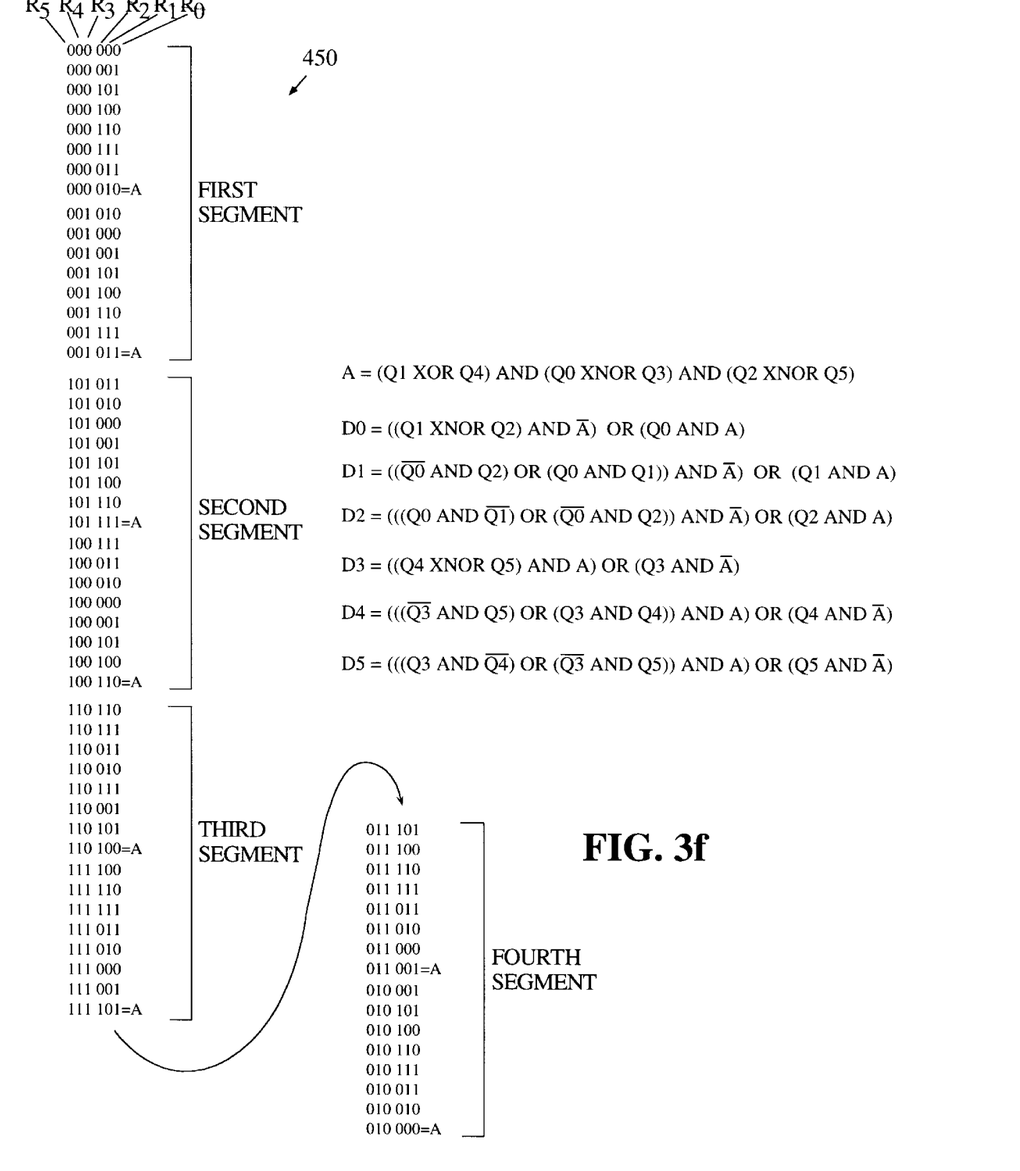
FIG. 3f illustrates successive states of a 64-bit address counter and related equations.

FIGS. 3e and 3f illustrate Grey code sequences for 32-bit and 64-bit FIFOs respectively and may be used when deeper FIFOs are required.

When the write address catches up to the read address, the DIRECTION signal will have a logic "1" value. For example, assume that the write address and the read address are separated by two quadrants. The write address can be considered two quadrants behind or ahead of the read address. Under these conditions, the state of the DIRECTION signal remains unchanged from its previous state. (In embodiments having more than four segments, the DIRECTION signal could remain unchanged over several intermediate segments. In an embodiment having only three segment, there would be no intermediate segment in which the DIRECTION signal remains unchanged.) As the write address catches up to the read address, the write address enters the quadrant immediately prior to the quadrant of the read address. At this time, direction circuit 104 causes the DIRECTION signal to have a logic "1" value. As the write address continues to catch up to the read address, the write address enters the same quadrant as the read address. When this happens, the state of the DIRECTION signal remains unchanged. Thus, when the write address catches up to and equals the read address, the DIRECTION signal will always have a logic "1" value.

If the write address catches up to the read address, by definition, FIFO memory 101 is full. Therefore, as described in more detail below, a DIRECTION signal having a logic "1" value is used to indicate that FIFO memory 101 is full when the read address is equal to the write address.

Conversely, when the read address catches up to the write address, the DIRECTION signal will have a logic "0" value. Again, assume that the write address and the read address are separated by two quadrants. The read address can be considered two quadrants behind or ahead of the write address. Under these conditions, the state of the DIRECTION signal remains unchanged from its previous state. As the read address catches up to the write address, the read address enters the quadrant immediately prior to the quadrant of the write address. At this time, direction circuit 104 causes the DIRECTION signal to have a logic "0" value. As the read address continues to catch up to the write address, the read address enters the same quadrant as the write address. When this happens, the state of the DIRECTION signal remains unchanged. Thus, when the read address catches up to and equals the write address, the DIRECTION signal will always have a logic "0" value.

If the read address catches up to the write address, by definition, FIFO memory 101 is empty. Therefore, as described in more detail below, a DIRECTION signal having a logic "0" value is used to indicate that FIFO memory 101 is empty when the read address is equal to the write address.

The DIRECTION signal is generated at an uncritical time by direction circuit 104, i.e., at least one operating cycle before the read address is equal the write address. The DIRECTION signal is provided to EMPTY logic circuit 105 and FULL logic circuit 106.

Figure 4B:
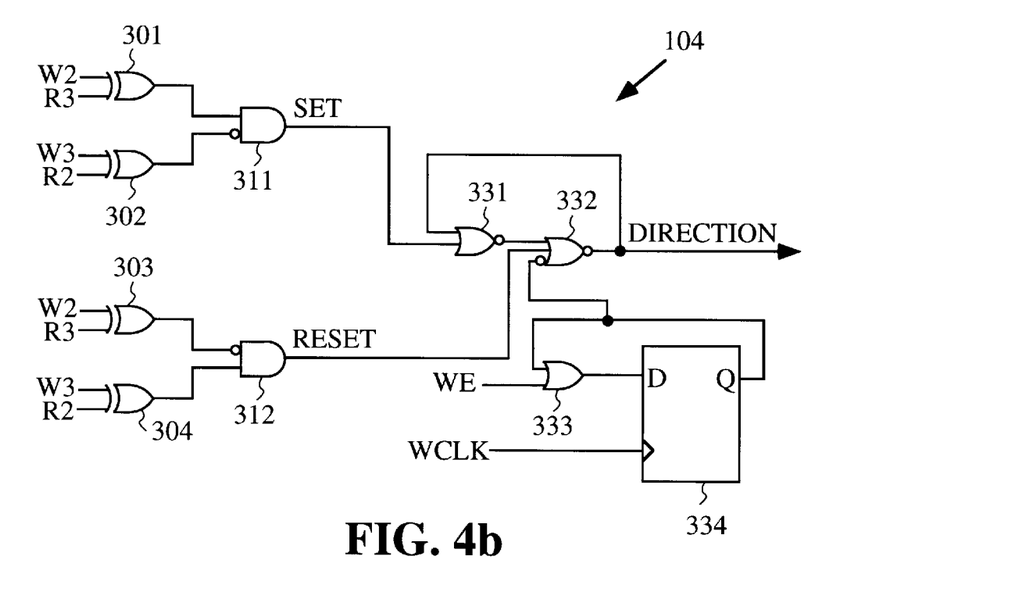
FIG. 4b is a schematic diagram of a direction circuit in accordance with an alternative embodiment of the invention.

FIG. 4b is a schematic diagram illustrating an alternative embodiment of direction circuit 104 useful with both synchronous and asynchronous logic. The circuit of FIG. 4b includes NOR gates 331 and 332, OR gate 333 and D-Q flip flop 334. Flip flop 334 is initially reset, such that the Q output of flip flop 334 provides a logic "0" value to the inverting input terminal of OR gate 332. This logic "0" value causes the output of NOR gate 332, i.e., the DIRECTION signal, to initially have a logic "0" value.

Since FIFO memory 101 is initially empty, the first operation performed within memory 101 is a write operation. During this first write operation, the write enable signal WE has a logic "1" value. The write clock signal WCLK sets the Q output signal of flip flop 334 to a logic "1" value. This Q output signal is fed back to the D input of flip flop 334 through OR gate 333. As a result, the Q output signal of flip flop 334 remains at a logic "1" value after the initial write operation. While the Q output signal has a logic "1" value, the Q output signal no longer effects the state of the DIRECTION signal.

Exclusive OR gates 301–304 and AND gates 311–312 are connected in the manner previously described in connection with FIG. 4a. The signals provided by AND gates 311 and 312 are provided to input terminals of NOR gates 331 and 332, respectively. The output of NOR gate 331 is connected to an input terminal of NOR gate 332. The DIRECTION signal is provided to an input terminal of NOR gate 331. As a result, the DIRECTION signal will transition to (or remain in) a logic "1" state if the write address is one quadrant behind the quadrant of the read address (i.e., W3 W2 R3 R2=0010, 1011, 1101 or 0100). Similarly, the DIRECTION circuit will transition to (or remain in) a logic "0" state if the read address is one quadrant behind the quadrant of the write address (i.e., W3 W2 R3 R2=0010, 1011, 1101 or 0100). The direction circuit 104 illustrated in FIG. 4b advantageously does not require the assertion of a clock signal for the DIRECTION signal to change states. Since WRITE and READ are asynchronous with respect to each other, they can both change at the same time, but this event does not cause a decode glitch.

Figure 5:
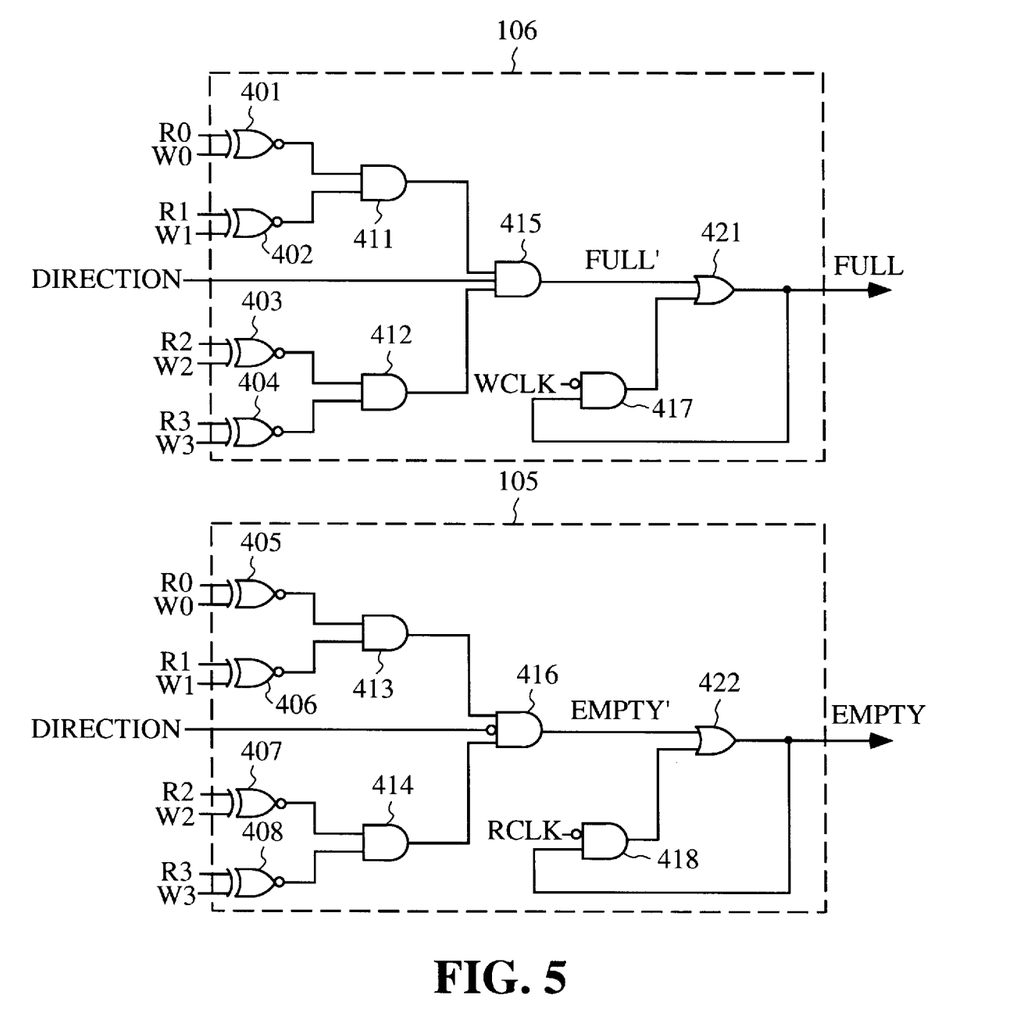
FIG. 5 is a schematic diagram of an EMPTY logic circuit and a FULL logic circuit in accordance with one embodiment of the invention.

FIG. 5 is a schematic diagram of EMPTY logic circuit 105 and FULL logic circuit 106. EMPTY logic circuit 105 and FULL logic circuit 106 include exclusive NOR gates 401–408, AND gates 411–418 and OR gates 421–422. Within FULL logic circuit 106, exclusive NOR gate 401 receives read and write address signals R0 and W0, exclusive NOR gate 402 receives read and write address signals R1 and W1, exclusive NOR gate 403 receives read and write address signals R2 and W2, and exclusive NOR gate 404 receives read and write address signals R3 and W3. The output terminals of exclusive NOR gates 401 and 402 are connected to input terminals of AND gate 411 and the output terminals of exclusive NOR gates 403 and 404 are connected to input terminals of AND gate 412. The output terminals of AND gates 411 and 412 are connected to input terminals of AND gate 415. The DIRECTION signal is also provided to an input terminal of AND gate 415. AND gate 417 and OR gate 421 perform a signal stretching function described in more detail below.

When read address R3-R0 is identical to write address W3-W0, each of AND gates 411 and 412 provides a logic "1" value to the input terminals of AND gate 415. If the DIRECTION signal also has a logic "1" value at this time, a FULL signal having a logic "1" value is generated and provided to OR gate 421. In response, OR gate 421 provides a FULL signal having a logic "1" value, thereby indicating that FIFO 101 is full. This signal is transmitted to control circuitry (not shown) which prevents additional write operations from occurring until the FULL signal transitions back to a logic "0" state. Write operations are prevented by not activating the write enable signal WE or not enabling the write clock signal within FIFO memory 101. The FULL signal transitions to a logic "0" state after the next read operation is performed. At this time, there is a memory location in FIFO 101 to which a data value can be written.

EMPTY logic circuit 105 is connected to operate in a manner similar to FULL logic circuit 106. However, in EMPTY logic circuit 106, an EMPTY signal having a logic "1" value is generated by AND gate 416 only when the read address is equal to the write address and the DIRECTION signal has a logic "0" value. An EMPTY signal having a logic "1" value indicates that FIFO 101 is empty. The EMPTY signal is provided to OR gate 422. In response, OR gate 422 provides an EMPTY signal having a logic "1" value to control circuitry (not shown) which prevents data values from being read from FIFO memory 101 until the EMPTY signal transitions back to a logic "0" state. The EMPTY signal transitions to a logic "0" state after the next write operation is performed. At this time, there are data values stored in FIFO 101 which can be read.

In a particular embodiment, FIFO circuit 101 is operated synchronously in response to a single system clock. This system clock can have a relatively high frequency (e.g., 50 to 70 MHz). In another embodiment, system 100 is operated asynchronously in response to a read clock signal RCLK and a write clock signal WCLK which have different frequencies.

When system 100 is operated asynchronously, read address counter 103 and write address counter 102 are operated asynchronously with respect to each other. The effect of this asynchronous operation will now be examined with respect to the FULL and EMPTY signals.

The FULL signal transitions to a logic "1" value at a predetermined time after the edge of the write clock signal WCLK which caused the FULL condition to exist. The transition of the FULL signal from a logic "0" value to a logic "1" value is therefore synchronous with the write clock signal WCLK. However, the FULL signal transitions to a logic "0" value at a predetermined time after the edge of the read clock signal RCLK that caused the FULL condition to cease to exist. The transition of the FULL signal from a logic "1" value to a logic "0" value is therefore asynchronous with respect to the write operations.

A potential timing problem therefore exists when the FULL signal transitions to a logic "0" value and a subsequent write operation is initiated. Because the write operation is asynchronous with respect to the 1-to-0 transition of the FULL signal, an insufficient set up time might exist for the write operation. To eliminate this potential timing problem, the transition of the FULL signal from a logic "1" value to a logic "0" value is "stretched" to guarantee that adequate write set up times exist for write operations which occur after the FULL signal transitions to a logic "0" value.

The FULL signal is stretched by preventing the FULL signal from transitioning to a logic "0" value when the write clock signal WCLK is in its logic low state, i.e., during the half-period of the write clock before the rising edge of the write clock signal. (One skilled in the art will recognize that an embodiment of the opposite clocking polarity can be used where the FULL signal is prevented from transitioning to a logic "0" value when the write clock signal WCLK is in its high state.)

The FULL signal is stretched by AND gate 417 and OR gate 421. If the FULL signal has a logic "1" value and the write clock signal has a logic "0" value, the output signal of AND gate 417 has a logic "1" value. As a result, when the FULL signal transitions to a logic "0" value (as a result of a subsequent read operation), the FULL signal does not transition to a logic "0" value until the write clock signal WCLK has a logic "1" value. In this manner, the FULL signal is effectively stretched.

Similarly, the EMPTY signal transitions to a logic "1" value at a predetermined time after the read clock edge which caused the EMPTY condition to exist. The transition of the EMPTY signal from a logic "0" value to a logic "1" value is therefore synchronous with the read clock signal RCLK. However, the EMPTY signal transitions to a logic "0" value at a predetermined time after the edge of the write clock signal WCLK that caused the EMPTY condition to cease to exist. The transition of the EMPTY signal from a logic "1" value to a logic "0" value is therefore asynchronous with respect to the read operations.

A potential timing problem therefore exists when the EMPTY signal transitions to a logic "0" value and a subsequent read operation is initiated. Because the read operation is asynchronous with respect to the transition of the EMPTY signal, an insufficient set up time may exist for the read operation. Consequently, the transition of the EMPTY signal from a logic "1" value to a logic "0" value is "stretched" to guarantee that adequate set up times exist for read operations which occur after the EMPTY signal transitions to a logic "0" value. The EMPTY signal can be stretched by preventing the EMPTY signal from transitioning to a logic "0" value when the read clock signal RCLK is in its logic low state, i.e., during the half-period of the write clock before the rising edge of the read clock signal. (Again, for a falling edge clock, transition can be prevented when RCLK is in its logic high state.) The EMPTY signal is stretched by AND gate 418 and OR gate 422, which operate in the manner previously described in connection with AND gate 418 and OR gate 421.

Operation of memory system 100 when FIFO memory 101 is neither empty nor full will now be described. When the write enable signal WE is asserted and FIFO 101 is not FULL (i.e., the FULL signal has a logic "0" value), the rising edge of the write clock signal WCLK causes data input signal DIN to be written to FIFO memory 101 at a location corresponding to the current write address. Write address counter 102 is then incremented. The second port of FIFO 101 presents the data value DOUT from the current read address.

When the read enable signal RE is asserted and FIFO 101 is not EMPTY (i.e., the EMPTY signal has a logic "0" value), the rising edge of the read clock signal increments read address counter 103. A new output data value DOUT is provided to the second port of FIFO memory 101 in response to this new read address.

If the described embodiment is implemented in an FPGA, direction circuit 104, EMPTY logic circuit 105 and FULL logic circuit 106 are implemented using one CLB each.

Write address counter 102 and read address counter 103 are implemented using two CLBs each. As a result, the entire 16×16 FIFO memory system 100 can be implemented using a total of 23 CLBs. The present invention provides in various embodiments a simple and robust structure for determining whether identity of the read and write addresses indicates a FIFO EMPTY or FIFO FULL condition. The circuitry used to make this determination is less complex and requires less hardware than prior art circuits which perform the same function.

Table 1 sets forth timing parameters for memory system 100 when memory system 100 is implemented in Xilinx's XC4000E FPGA.

TABLE 1

| Write | |
|---|---|
| Write Cycle Time | 14.4 ns = 70 MHz |
| Clock Pulse Width | 7.2 ns |
| WE Set Up Time Before Write Clock | 2.0 ns |
| Address Inputs: | |
| Write Counter Delay | 2.8 ns |
| Address Set Up Time | 2.4 ns |
| Max Allowed Address Routing Delay @ 70 MHz | 14.4 − 2.8 − 2.4 = 9.2 ns |
| Data Inputs: | |
| Possible Data Register Delay | 2.8 ns |
| Data Set Up Time | 3.2 ns |
| Max Allowed Data Input Route Delay @ 70 MHz | 14.4 − 2.8 − 3.2 = 8.4 ns |
| Read | |
| EC Set Up Time Before Write Clock | 3.0 ns |
| Address Inputs: | |
| Read Counter Delay | 2.8 ns |
| Data Outputs: | |
| Data Valid After Address | 2.0 ns |
| Max Allowed Address & | 14.1 − 2.0 − 3.2 = 9.2 ns |
| Control FULL & EMPTY | |
| Write or Read Counter Delay | 2.8 ns |
| FULL or EMPTY Delay | 4.3 ns |
| WE Set Up Time Before Write Clock | 2.0 ns |
| EC Set Up Time Before Write Clock | 3.0 ns |
| Max Allowed Address Route & Decision Delay | 14.4 − 2.8 − 4.3 − 3.0 = 4.3 ns |

Although the invention has been described in connection with several embodiments, it is understood that this invention is not limited to the embodiments disclosed, but is capable of various modifications which would be apparent to a person skilled in the art. For example, other logic circuitry could be used by one skilled in the art to perform the functions described in the specification. Moreover, memory system 100 can be modified to operate in accordance with FIFO memories 101 having other sizes. For example, one skilled in the art could expand FIFO memory 101 to a 64×8 memory by connecting four of the previously described 16-bit FIFO memories to provide a FIFO memory having a depth of 64 bits. The read address counter, write address counter and direction circuit would then be modified in accordance with the principles previously described to generate the EMPTY and FULL signals. In such an embodiment, the read address and the write address would be provided to each of the four connected FIFO memories. The write enable signal would only be provided to one of the four connected FIFO memories in accordance with the value of the write address. Memory system 100 can also be modified for operation in connection with a FIFO memory 101 having a single port. Thus, the invention is limited only by the following claims.

I claim:

1. A first in, first out (FIFO) memory system comprising:
a memory having a plurality of locations each having an address;
a write address counter coupled to the memory for storing a write address representative of an address within the memory to which a write operation is to be performed, wherein the write address counter is configured to increment the write address in a predetermined circular sequence which is divided into at least three segments, and wherein a portion of the write address is encoded to indicate the segment in which the write address exists within the circular sequence and the write address is encoded using a Grey code;
a circular read address counter coupled to the memory for storing a read address representative of an address within the memory from which a read operation is to be performed, wherein the read address counter is configured to increment the read address in the same predetermined circular sequence as the write address, and wherein a portion of the read address is encoded to indicate segment in which the read address exists within the circular sequence and the read address is encoded using a Grey code; and
a first control circuit coupled to receive the encoded portions of the read and write addresses from the read and write address counters, wherein the control circuit, in response to the encoded portions of the read and write addresses, generates a first control signal having a first state as a result of the read address being in a segment prior to the segment of the write address, and generates a first control signal having a second state as a result of the write address being in a segment prior to the segment of the read address, wherein the state of the first control signal is used to determine whether the memory is empty or full.

2. The FIFO memory system of claim 1, further comprising:
a second control circuit coupled to receive the read address, the write address and the first control signal, wherein the second control circuit asserts an EMPTY control signal indicating that the memory is empty when the read address equals the write address and the first control signal is in the first state, and
wherein the second control circuit asserts a FULL control signal indicating that the memory is full when the read address equals the write address and the first control signal is in the second state.

3. The FIFO memory system of claim 2, wherein the second control circuit further comprises:
a first stretching circuit which prevents the EMPTY control signal from being de-asserted for a time period before a read operation is attempted; and
a second stretching circuit which prevents the FULL control signal from being de-asserted for a time period before a write operation is attempted.

4. The FIFO memory system of claim 2, wherein the memory, write address counter, read address counter, first control circuit and second control circuit are implemented by a field programmable gate array.

5. The FIFO memory system of claim 1, wherein the circular sequences of the read and write addresses each have four segments.

6. The FIFO memory system of claim 1, wherein the memory is a dual-port memory.

7. The FIFO memory system of claim 1, wherein the write address counter and the read address counter operate synchronously.

8. The FIFO memory system of claim 1, wherein the write address counter and the read address counter operate asynchronously.

9. The FIFO memory system of claim 1, in which said first control circuit comprises:
a first decoder circuit for generating a SET signal when said write address is in a segment prior to said segment of the read address;
a second decoder circuit for generating a RESET signal when said read address is in a segment prior to said segment of the write address;
a storage device which provides a logic 1 in response to said SET signal and a logic 0 in response to said RESET signal.

10. A method of operating a first in, first out (FIFO) memory, comprising the steps of:
providing a memory having a plurality locations each having an address;
storing a write address representative of an address within the memory to which a write operation is to be performed;
incrementing the write address in a predetermined circular sequence according to a Grey code, wherein the circular sequence is divided into a t least three segments;
encoding a portion of the write address to indicate the segment in which the write address exists within the circular sequence;
providing a read address representative of an address within the memory from which a read operation is to be performed;
incrementing the read address in the same predetermined circular sequence as the write address according to the Grey code;
encoding a portion of the read address to indicate the segment in which the read address exists within the circular sequence;
comparing the segment in which the write address exists to the segment in which the read address exists;
generating a first control signal having a first state as a result of the read address existing in a segment prior to the segment in which the write address exists;
generating a first control signal having a second state as a result of the write address existing in a segment prior to the segment in which the read address exists; and
using the state of the first control signal to determine whether the memory is empty or full.

11. The method of claim 10, wherein the step of using the first control signal further comprises the steps of:
determining whether the read address equals the write address;
asserting an EMPTY control signal which indicates the memory is empty when the read address equals the write address and the first control signal is in the first state; and
asserting a FULL control signal which indicates the memory is full when the read address equals the write address and the first control signal is in the second state.

12. The method of claim 11, further comprising the steps of:
preventing the EMPTY control signal from being de-asserted for a selected time period before a read operation can be performed; and preventing the FULL control signal from being de-asserted for a selected time period before a write operation can be performed.

13. The method of claim 11, further comprising the step of incrementing the read address and the write address in a synchronous manner.

14. The method of claim 11, further comprising the step of incrementing the read address and the write address in an asynchronous manner.

15. A first in, first out (FIFO) memory system comprising:

a memory having a plurality locations each having an address;

means for storing a write address representative of an address within the memory to which a write operation is to be performed;

means for incrementing the write address according to a Grey code, wherein the circular sequence is divided into at least three segments;

means for encoding a portion of the write address to indicate the segment in which the write address exists within the circular sequence;

means for providing a read address representative of an address within the memory from which a read operation is to be performed;

means for incrementing the read address according to the Grey code;

means for encoding a portion of the read address to indicate the segment in which the read address exists within the circular sequence;

means for comparing the segment in which the write address exists to the segment in which the read address exists;

means for generating a first control signal having a first state as a result of the read address existing in a segment prior to the segment in which the write address exists, and having a second state as a result of the write address existing in a segment prior to the segment in which the read address exists; and means for using the state of the first control signal to determine whether the memory is empty or full.

* * * * *